(No Model.) 2 Sheets—Sheet 1.
J. STEPHENSON.
GRIP CARRIER.
No. 421,629. Patented Feb. 18, 1890.
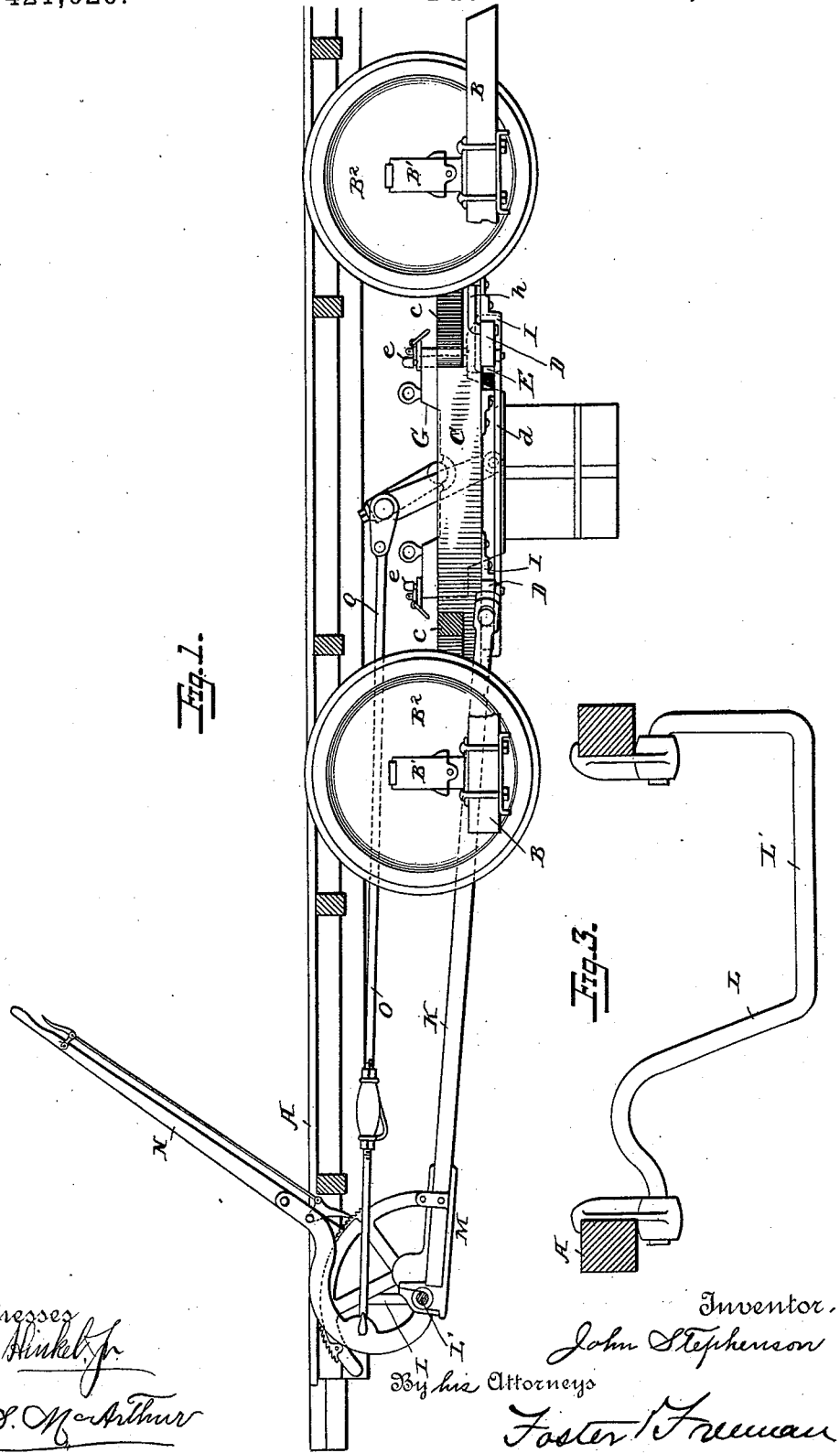

(No Model.) 2 Sheets—Sheet 2.
J. STEPHENSON.
GRIP CARRIER.
No. 421,629. Patented Feb. 18, 1890.
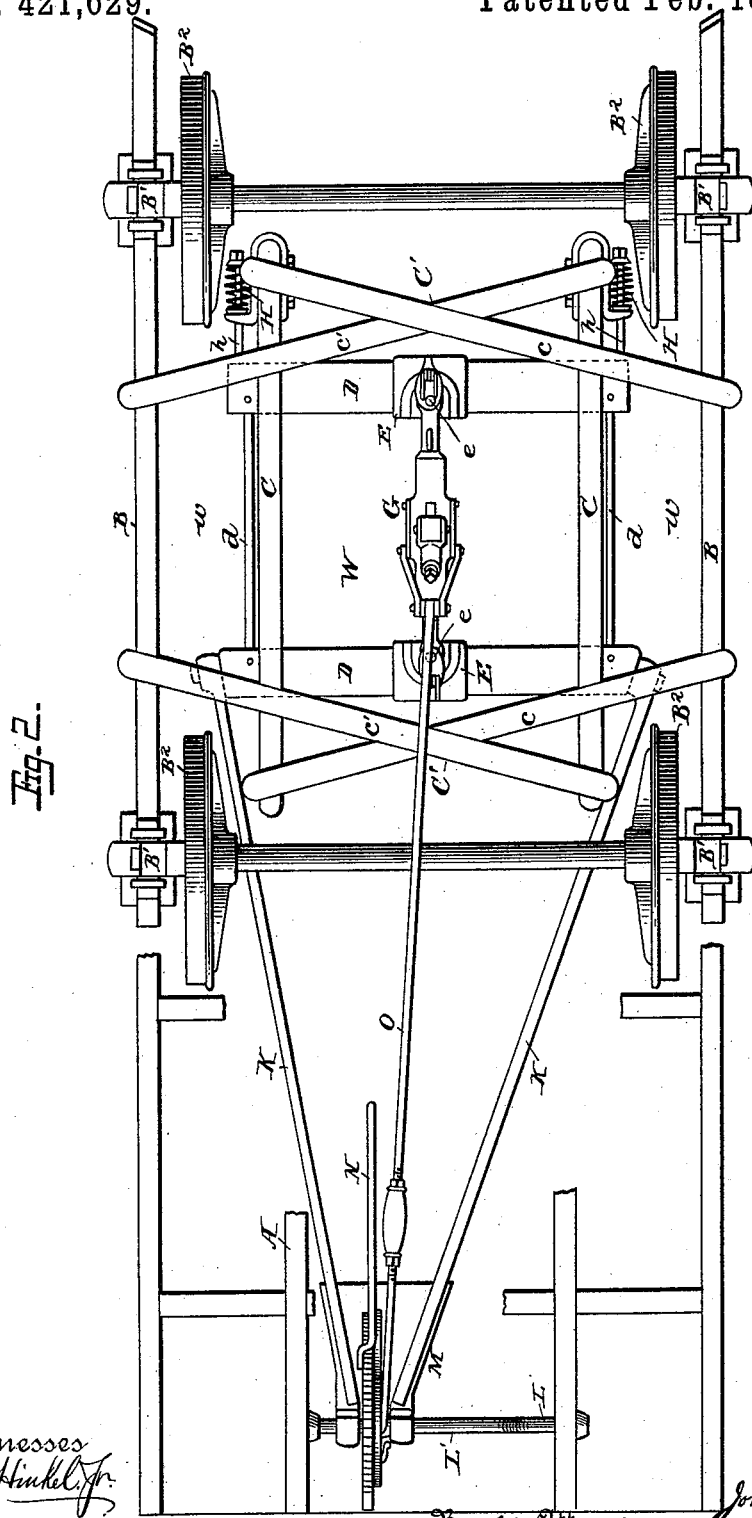
Witnesses
Jno. G. Hinkel, Jr.
W. S. McArthur
Inventor,
John Stephenson
By his Attorneys
Foster & Freeman

UNITED STATES PATENT OFFICE.

JOHN STEPHENSON, OF NEW YORK, N. Y.

GRIP-CARRIER.

SPECIFICATION forming part of Letters Patent No. 421,629, dated February 18, 1890.

Application filed October 7, 1889. Serial No. 326,259. (No model.)

*To all whom it may concern:*

Be it known that I, JOHN STEPHENSON, a citizen of the United States, and a resident of the city, county, and State of New York, have invented certain new and useful Improvements in Grip-Carriers, of which the following is a specification.

Tram-cars propelled by cable being of comparatively recent origin, they are developing new necessities, among which is the change of the cable grip-machine from the car-body to the truck, which may free the body from incumbrance and hold the grip-machine under conditions better adapted to the requirements of the cable. The practice heretofore largely prevailing of suspending the grip from the car-bottom is attended with evils, among which may be stated that if the grip is suspended to a car-body mounted on springs the grip is exposed to vertical deviation from the cable-carrying sheaves and difficulties in restoring the cable to the grip, and to avoid this difficulty special cars having no springs have sometimes been used, but such are uncomfortable for passengers and the car structure suffers from rough motion. I avoid this and other difficulties by locating the grip-carrier with its grip-machine central to the wheeled base and borne by a truck not resting on springs and independent of the car-body, which rests on springs. In this way my improved grip-carrier is designed to meet, among others, the following requirements, viz: It is adapted to the size and form of the grip-machine; to afford the grip-machine liberty for motion required by the cable; to hold the grip-machine in unvariable plane with the cable; to allow the grip-machine to be easily attached or detached from the car; to readily grip or release the cable; to afford the grip-operator the utmost facility for action, and finally to connect the grip-machine and its carrier with the truck in such a manner as to relieve or mollify the jerk of the cable.

The accompanying drawings illustrate a construction embodying my improved features answering the requirements above stated, and in the drawings—

Figure 1 is a side view, partly in section, of a truck and a portion of the floor of a car. Fig. 2 is a plan view of the truck and showing a portion of the framing of the car-floor, and Fig. 3 is a detail view of the link or support for the grip-carrier extension.

The car-body, a portion of the frame A of which is shown, may be mounted upon the truck in any desired way, not necessary to be specifically indicated herein. The truck itself is shown as consisting, essentially, of the side sills B, secured to the axle-boxes B' outside the wheels $B^2$ and on the same journals which carry the car-body. Between the sills B, I arrange two cheek-sills C, practically parallel with the sills, but shorter, and these are connected to the sills by means of two composite end cross-rails C' C', each composed of two pieces $c\ c'$, of more than half the length of the cross-rails, the pieces being framed to cross each other at an obtuse angle midway between the truck-sills, each of which sills receives one end of each composite cross-rail $c$ $c'$, leaving the other or loose ends of the rails beyond the crossing endward of the truck to be utilized for holding recoil-springs and for other purposes, and supported upon the cheek-sills. The truck-frame thus made has at its middle an opening, of which the cheek-sills form two sides and the composite cross-rails C' four sides, constituting a well $w$ of six sides adapted to the grip-carrier, of sufficient length to support a grip of unusual length, designed to cause less abrasion of the cable. At each side of the grip-well W are smaller wells $w$ of an irregular figure of practically four sides, which are adapted to hold the wheel-brake and track-brake mechanisms.

The motions of the grip and its carrier as required by the cable are chiefly lengthwise and crosswise of the car. Thus when the grip seizes the moving cable the tendency is to instantly jerk the car into motion, and to prevent the rudeness of this motion is one of the objects of my invention. Mounted on the cheek-sill C, in elongated bearings or slots, are the traverse guide-bars D, of substantially uniform cross-section, and on these bars are the sleeves E, each provided with a cove or standing post $e$ for supporting the grip G. The bars D are connected together by articulated rods $d$, and the rear transverse bar is connected to recoil-springs H by the rods $h$, the springs being connected with the cheek-sills. These recoil-springs yield to the jerk of the cable and start the car easily, after which the recoil of the springs restores the grip-carrier to the place of its original service. The greater motion required of the grip-carrier is crosswise of the car, as when passing curves, and especially at detours, where the car is turned into a side-track, while the slot-rail, with its grip-machine, retains its regular alignment. This motion of the grip-machine is allowed for by the movement of the sleeves upon the tranverse bars, as well as by the movement of the carrier on the recoil-springs. Thus it will be seen that the cable controls the grip-machine in any direction, except when limited by the recoil-springs, the carrier composed of the two transverse bars and their articulated rods making a four-sided figure capable of varied form, and the ends of the transverse bars being supported in keepers I below the cheek-sills, which allow freedom of motion in any horizontal direction.

It may be observed that the place here assigned to the grip and its carrier is the best for accomplishing its purpose, and being central to the wheeled base is less affected by curves of the track and best adapted for the moving cable to impart motion to the car-body and the truck. The grip may be connected to the sleeves by means of a cove or standing-post, and there retained by suitable locking devices, and when desired it can be removed, as through the bottom of the car or otherwise, these latter features forming no part of my present invention.

It has been generally customary to place the grip-operator or gripman centrally of the car immediately above the grip; but experience has determined that the best place for the gripman is at the car-front, as his duty is not only to start and stop the car, but to be steadily on the lookout, in order to prevent collisions and to protect the public from harm. Hitherto no satisfactory method has developed of having the gripman so far removed from the grip-machine and from the wheel and track brakes, all of which are worked by the gripman, and one of the objections has been the lost motion of the mechanisms connecting the levers and the grip or brake mechanisms. I overcome these objections by practically extending the grip-carrier to the front of the car; and this I do by means of the grip-carrier extension side bars K, which are shown pivoted to the ends of the forward transverse bar D, and connected to the housing M, mounted upon the link L, supported in the forward under side of the car-frame A, and allowing movement of the grip-carrier to correspond with the motions caused by the cable or slot in the track. The link L is preferably formed substantially as shown in Fig. 3, and is pivotally suspended from the frame A of the car-floor, and bent to form a straight portion L', to which the housing M, carrying the extension of the transverse bars, is connected, and this housing and its connections can slide or move laterally upon the straight portion of the link, and the link itself can swing backward and forward in accordance with the movements of the grip-carrier to one side or the other. In this way the grip-operating lever and the grip-carrier are maintained in their relations to each other, and the carrier constitutes a figure of changeless form, with its apex suspended from the car-floor on the link, while it can move in all directions horizontally to accommodate itself to the relative motions of the car and the cable. The grip-operating lever N and the articulated grip-connecting rod O, by means of which the grip is operated, are also mounted in the housing M and move therewith.

What I claim is—

1. A cable-car grip-carrier having two transverse guide-bars of substantially uniform cross-section, the two bars connected at their ends by two articulated slide-rods forming a four-sided figure, substantially as described.

2. A cable-car grip-carrier having two transverse guide-bars mounted in supports to permit a limited play, and having sleeves mounted upon the transverse bars, substantially as described.

3. A cable-car grip-carrier having two transverse bars carrying sliding sleeves, having posts or sockets for the grip, the transverse bars being connected by articulated slide-bars, substantially as described.

4. A cable-car grip-carrier having two transverse bars, the ends of which are connected to the car structure, and each transverse bar having on it a metal sleeve adapted to slide on its bar toward the sides of the car, the transverse bars being connected by articulated side rods, substantially as described.

5. A cable-car grip-carrier extended by side bars connected with the transverse bar, substantially as described.

6. A tram-car with its grip-carrier extended toward the car end, the extended ends being connected by a housing, the extension being a practical triangle, substantially as described.

7. A tram-car with its grip-carrier extended toward the car end, a housing for the extended ends, and a link supporting the housing and allowing freedom for motions required by the grip-machine, substantially as described.

8. A tram-car with its grip-carrier having a transverse bar, and extended side bars journaled to the ends of the transverse bar and mounted in a housing, substantially as described.

9. A cable-grip carrier located at the car center having its extension side bars lodged in a housing, the housing and what it carries being suspended by a link, allowing freedom of motion thereto, substantially as and for the purpose specified.

10. A cable-car grip-carrier located at the center of its wheel-base, having its extension side bars housed and flexibly supported at the car end and having journal-bearings for the operating-lever in the housing, and the articulated rod-connection with the grip-machine, whereby the gripman at the car end can operate the grip mechanism at the car center, while the grip-carrier can be moved by the cable in every horizontal direction, substantially as described.

11. A cable-grip carrier located at or near the center of the wheel-base and having side bars extended to near the end of the car, an operating grip-lever mounted in the extension, and an articulated rod connecting the lever with the grip, whereby the relations of the grip and lever are maintained regardless of the position of the carrier, substantially as described.

12. A cable-grip truck having a six-sided central well and a grip-carrier mounted in the well, substantially as described.

13. A cable-car truck having a six-sided well, a grip-carrier consisting of a four-sided frame mounted in said well and supporting the grip, substantially as described.

14. A cable-car truck borne on the axle-journals outside the car-wheels and having a six-sided well, in which the grip-carrier is mounted, substantially as described.

15. A cable-car truck having a six-sided well and a grip-carrier mounted in the well and consisting, essentially, of two transverse bars connected by side bars, the transverse bars being supported beneath the cheek-sills of the truck and having freedom of motion therein, substantially as described.

16. A cable-car truck having a six-sided well, a grip-carrier consisting of a four-sided frame mounted in the well, the forward portion of the frame being extended to the car-front and the rear portion connected by recoil-springs to the sills of the truck, substantially as described.

17. A cable-car truck having a six-sided grip-well, a four-sided grip-carrier mounted in the well and having freedom for endward motion, the grip-carrier frame being connected by a rod and spring with the end of the cheek-sills of the well, substantially as described.

18. A cable-car truck having a well, a four-sided grip-carrier mounted in the well and having freedom of motion, extensions from the grip-carrier to the forward end of the car, a housing for said extensions, a link supporting said housing, and a grip-operating lever fulcrumed in said housing, whereby the grip-carrier and lever may accommodate themselves to the movements of the grip under the influence of the cable, substantially as described.

In testimony whereof I have signed my name to this specification in the presence of two subscribing witnesses.

JOHN STEPHENSON.

Witnesses:
 JOSEPH B. STEPHENSON,
 S. A. STEPHENSON.